United States Patent
Sasaki et al.

(10) Patent No.: US 7,215,373 B2
(45) Date of Patent: May 8, 2007

(54) OBJECT DISTANCE DISPLAY APPARATUS TO DISPLAY AN OBJECT DISTANCE BASED ON MEASURED OBJECT DISTANCE DATA

(75) Inventors: Tadashi Sasaki, Saitama (JP); Chikatsu Moriya, Saitama (JP)

(73) Assignee: Fujinon Corporation, Saitama (JP)

( * ) Notice: Subject to any disclaimer, the term of this patent is extended or adjusted under 35 U.S.C. 154(b) by 731 days.

(21) Appl. No.: 10/289,326

(22) Filed: Nov. 7, 2002

(65) Prior Publication Data

US 2003/0090567 A1 May 15, 2003

(30) Foreign Application Priority Data

Nov. 9, 2001 (JP) ............... 2001-344499

(51) Int. Cl.
*H04N 5/232* (2006.01)
*H04N 5/222* (2006.01)
*G03B 17/00* (2006.01)
*G03B 13/20* (2006.01)

(52) U.S. Cl. ............ 348/346; 348/333.02; 348/333.04; 396/88; 396/103; 396/291

(58) Field of Classification Search .......... 348/240.99, 348/240.3, 333.02, 333.04, 135, 141, 346, 348/348, 357, 138; 396/76, 70, 88, 103, 396/291
See application file for complete search history.

(56) References Cited

U.S. PATENT DOCUMENTS

| | | | |
|---|---|---|---|
| 4,540,262 A * | 9/1985 | Nakai et al. ................. | 396/147 |
| 4,959,675 A | 9/1990 | Seki et al. | |
| 5,092,670 A | 3/1992 | Preston | |
| 5,185,517 A | 2/1993 | Inamori et al. | |
| 5,530,548 A | 6/1996 | Campbell et al. | |
| 5,614,980 A * | 3/1997 | Wakabayashi et al. ...... | 396/147 |
| 5,859,733 A * | 1/1999 | Miyano et al. ............. | 359/824 |
| 6,148,151 A | 11/2000 | Bauer | |
| 6,317,199 B1 * | 11/2001 | Suzuki ...................... | 356/4.01 |
| 6,473,166 B1 * | 10/2002 | Ohishi et al. ............ | 356/141.1 |
| 6,587,141 B1 * | 7/2003 | Tanaka .................. | 348/240.99 |
| 6,822,684 B1 * | 11/2004 | Suzuki et al. ............... | 348/335 |

(Continued)

FOREIGN PATENT DOCUMENTS

EP  0 574 105 A1  12/1993

(Continued)

OTHER PUBLICATIONS

Japanese Office Action dated Jul. 11, 2006 w/English translation.

*Primary Examiner*—John M. Villecco
(74) *Attorney, Agent, or Firm*—Harness, Dickey & Pierce, P.L.C.

(57) ABSTRACT

The object distance display apparatus displays object distances according to actually measured object distance data entered in advance, matched with focusing lens positions acquired from a television lens device, and enables, when the apparatus is connected to the television lens device, any data entry error to be readily identified by graphically displaying the object distance data entered in advance. Actually measured object distance data entered in advance, matched with focusing lens positions, can be graphically displayed on an LCD panel with a touch panel function of the apparatus. If any abnormal datum such as an input error is detected, it can be deleted by touching a delete switch.

5 Claims, 5 Drawing Sheets

U.S. PATENT DOCUMENTS

| | | | |
|---|---|---|---|
| 2003/0011692 A1* | 1/2003 | Shore et al. | 348/333.02 |
| 2003/0025802 A1* | 2/2003 | Mayer et al. | 348/211.99 |
| 2005/0057677 A1* | 3/2005 | Hagiwara et al. | 348/333.01 |
| 2006/0029381 A1* | 2/2006 | Onozawa | 396/147 |

FOREIGN PATENT DOCUMENTS

| | | | |
|---|---|---|---|
| JP | 4-81730 | | 3/1992 |
| JP | 05153462 A | * | 6/1993 |
| JP | 08029655 A | * | 2/1996 |
| JP | 08278124 A | * | 10/1996 |
| JP | 2002287007 A | * | 10/2002 |

* cited by examiner

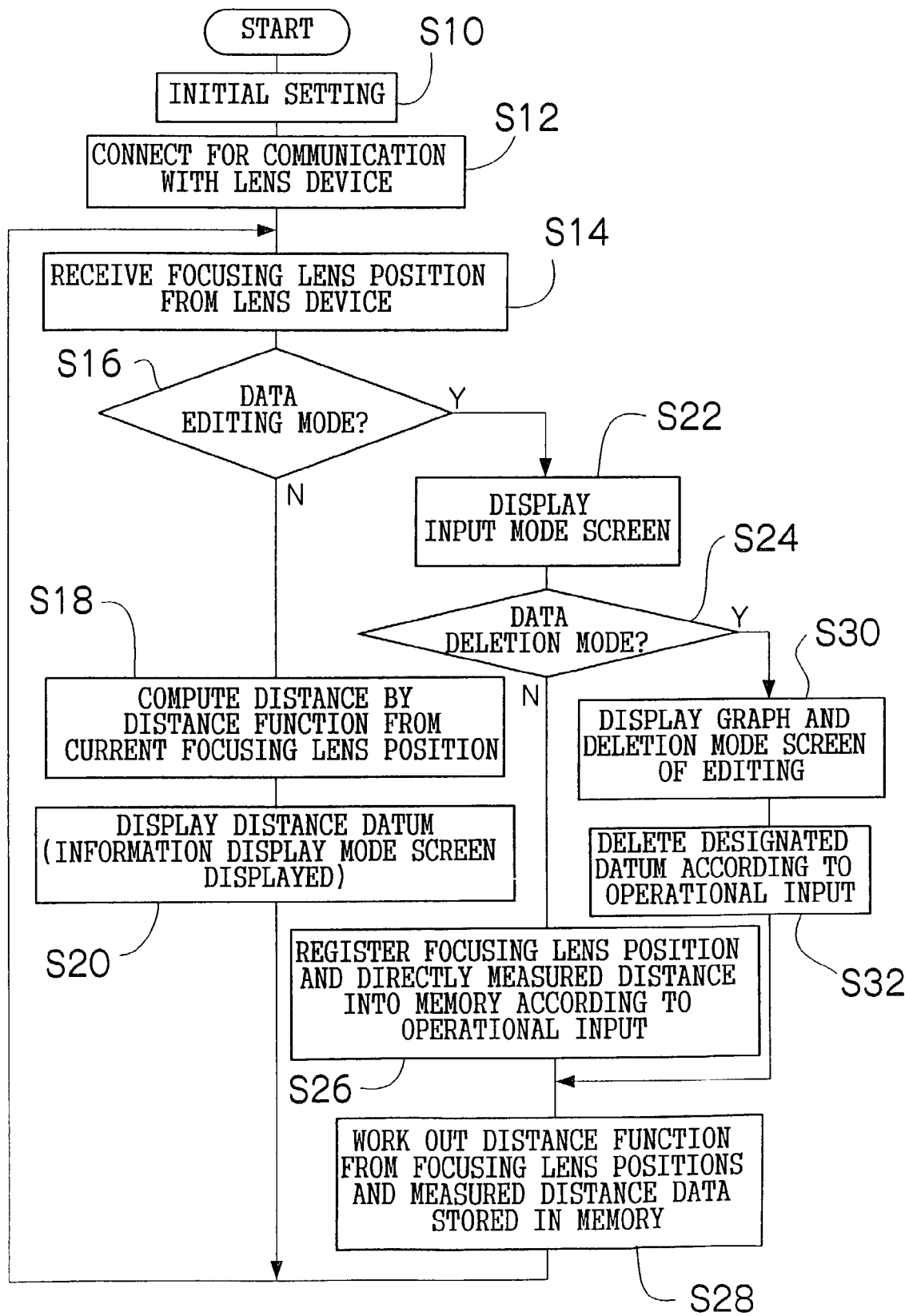

OBJECT DISTANCE DISPLAY APPARATUS TO DISPLAY AN OBJECT DISTANCE BASED ON MEASURED OBJECT DISTANCE DATA

BACKGROUND OF THE INVENTION

1. Field of the Invention

The present invention relates to an object distance display apparatus, and more particularly to an object distance display apparatus for displaying the distance to the object that is focused on by a lens device for television camera use.

2. Description of the Related Art

One of the present inventors has proposed in Japanese Patent Application Nos. 2001-85136 and 2001-285236 (which were, at the time the present invention was made, not published, not publically known, and assigned to the same assignee to which the present invention was subject to an obligation of assignment) object distance display apparatuses in television lens systems used in television cameras for broadcasting use or the like, which display the object distance by acquiring the focusing lens position in which the focusing lens of the lens device is currently set or the focusing lens position designated by a focus controlling device, such as a focus demand, to the lens device and figuring out and displaying the distance to the object that is focused upon in that acquired focusing lens position. Figuring out the object distance requires prior matching between the focusing lens position and the object distance, and the matching can be accomplished, for instance, in the following manner. First, a sample object is arranged in a certain position, the distance from the lens device to that sample object is directly measured, and the focusing lens of the lens device is driven to focus on that sample object. The object distance display apparatus acquires from the lens device the focusing lens position in which it is then set. Now, the actual measurement of the distance to the sample object is entered into the object distance display apparatus. The focusing lens position then set in the lens device is thereby matched with the object distance. By repeating this procedure at different distances of the sample object, a plurality of focusing lens positions and object distances can be matched with each other. According to this matching, a distance function representing the relationship between the focusing lens position and the object distance is figured out, and every position in the whole variable range of the focusing lens position is matched with one object distance or another.

In any of the object distance display apparatuses described above, it is impossible to check the accuracy of the already entered object distance data, and therefore, if a wrong distance is entered by mistake for instance, it is difficult to identify the wrong datum. Especially, unless the object distance displayed according to a wrong datum is evidently abnormal, it is difficult even to notice any error in entered data, and this would invite wrong estimation of the object distance. Even if something wrong in the entered data is noticed, it is impossible to identify the wrong datum, and accordingly there is a problem that the user of the camera would have to take the trouble of deleting all the entered data and enter correct data anew.

SUMMARY OF THE INVENTION

The present invention has been achieved in view of these circumstances and an object of the present invention, attempted in view of the circumstances described above, is to provide an object distance display apparatus capable of ready detecting and correcting any error, such as wrong inputting of necessary data for matching the focusing lens position and the object distance with each other, and minimize the inputting of so abnormal data that they can be perceived as evidently wrong entries.

In order to attain the object stated above, the present invention is directed to an object distance display apparatus which acquires one of a focusing lens position in which a focusing lens of a lens device is currently set and a focusing lens position designated by a focus controlling device to the lens device as a position in which the focusing lens is to be set and displays an object distance matching the acquired focusing lens position, in which by entering in advance object distance data corresponding to a plurality of focusing lens positions through an input device and matching each focusing lens position with an object distance, an object distance matching the acquired focusing lens position is figured out and displayed, the object distance display apparatus comprising: a display device which displays either numerically or graphically the object distance data entered in advance matched with the focusing lens positions.

According to the present invention, as the object distance data entered in advance matched with focusing lens positions can be displayed, any abnormal data due to an input error or the like can readily noticed.

Preferably, the object distance display apparatus further comprises a correcting device which deletes or corrects data as desired out of the object distance data entered in advance.

According to the present invention, it is further enabled to delete or correct any of the already entered object distance data as desired, there is no need to reenter all the data even if some of the data are erroneously entered, but their modification to correct data can be easily accomplished.

More preferably, the object distance display apparatus further comprises: an abnormal value determining device which determines, when an object distance datum matching a prescribed focusing lens position is newly entered through one of the input device and the correcting device, whether or not the newly entered object distance datum is an abnormal value according to a magnitude thereof relative to the already entered object distance data matching other focusing lens positions; and an alarming device which gives an alarm when the newly entered object distance datum is determined to be abnormal by the abnormal value determining device.

According to the present invention, when a new object distance datum is to be entered, if it is found abnormal in relative magnitude in comparison with the already entered other data, an alarm on abnormality can be issued, making it possible to exclude what seem to be abnormal data.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 5 is a flow chart showing a processing sequence regarding a displaying of an object distance in a CPU of a lens information display device.

DETAILED DESCRIPTION OF THE PREFERRED EMBODIMENTS

Preferred embodiments of an object distance display apparatus according to the present invention will be described in detail below with reference to the accompanying drawings.

Figure 1:
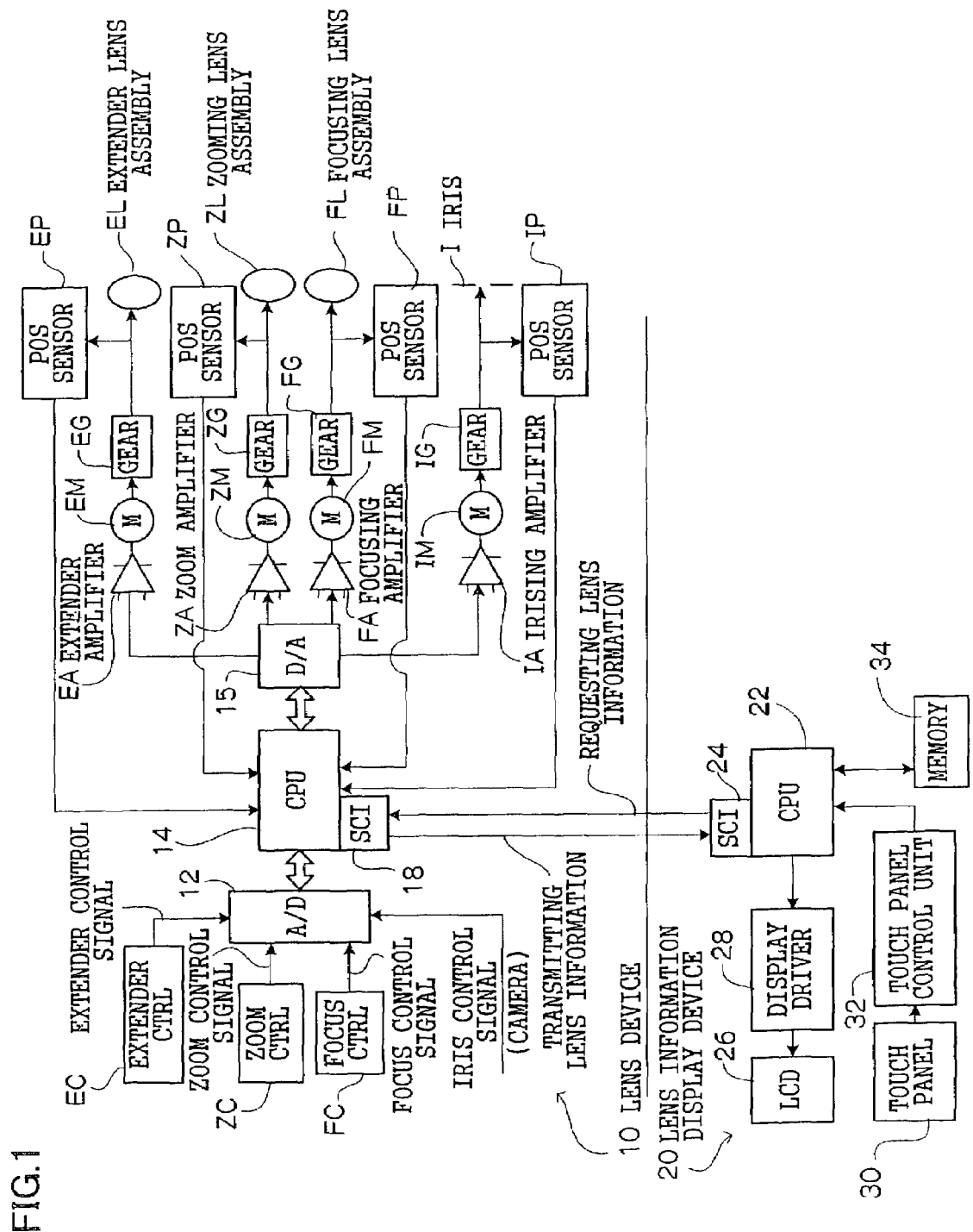
FIG. 1 is a control block diagram illustrating an overall configuration of a television lens system to which the present invention is applied.

FIG. 1 is a control block diagram illustrating an overall configuration of a television lens system to which the present invention is applied. First will be described a schematic configuration of a lens device 10 used in the television lens system. In the lens device 10 are arranged optical components including, as is well known, a zoom lens assembly ZL, a focusing lens assembly FL, an extender lens assembly EL and an iris I. The lens device 10 is provided with, respectively matching these optical components, a zoom motor ZM, a focusing motor FM, an extender motor EM and an irising motor IM, and it is further provided with power transmission mechanisms (gear trains) ZG, FG, EG and IG for transmitting the powers of the motors to the respective optical components. As each motor turns, the corresponding optical component is driven. When, for instance, the zoom motor ZM drives the zoom lens assembly ZL, the image magnification varies, or when the focusing motor FM drives the focusing lens FL, the object distance (distance to the object) varies. When the extender motor EM drives the extender lens assembly EL, the image magnification varies, for instance, from 100% to 200% or from 200% to 100%, or when the irising motor IM drives the iris I, the aperture stop (iris diameter) varies.

The lens device 10 receives a zoom control signal regarding zoom control, a focus control signal regarding focus control and an extender control signal regarding extender control from a zoom controller ZC, a focus controller FC and an extender controller EC, respectively, and further receives an iris control signal regarding iris control from a camera body on which the lens device 10 is mounted. Each of the control signals may be, for instance, an analog signal, which is converted into a digital signal by an A/D converter 12 in the lens device 10.

The lens device 10 is also mounted with a CPU 14, and the CPU 14 receives the control signals converted into the digital signals by the A/D converter 12 as well as position signals indicating the current positions of the zoom lens assembly ZL, the focusing lens assembly FL, the extender lens assembly EL and the iris I from potentiometers ZP, FP, EP and IP, respectively. The CPU 14 outputs drive signals for driving the motors ZM, FM, EM and IM according to the control signals and the position signals regarding the zoom, focus, extender and iris so that the zoom lens assembly ZL, the focusing lens assembly FL, the extender lens assembly EL and the iris I take on the target positions or the target speeds designated by the control signals, respectively.

The zoom control signal here usually is to designate the target speed of the zoom, while the other control signals are to designate target positions. The drive signals supplied from the CPU 14 are to designate the turning speeds (as well as the turning directions) of the respective motors.

The drive signals supplied from the CPU 14 are converted into analog signals by a D/A converter 15. The drive signal for the zoom motor ZM is entered into a zooming amplifier ZA; the drive signal for the focusing motor FM is entered into a focusing amplifier FA; the drive signal for the extender motor EM is entered into an extender amplifier EA, and the drive signal for the irising motor IM is entered into an irising amplifier IA. The amplifiers ZA, FA, EA and IA control voltages applied to the motors to enable them to turn at the speeds matching the respectively entered drive signals. This results in setting of the zoom lens assembly ZL, the focusing lens assembly FL, the extender lens assembly EL and the iris I in the target positions or at the target speeds designated by the respective control signals.

To a prescribed communication connector to the lens device 10 configured as described above is detachably connected an object distance display apparatus 20 according to the embodiment of the present invention through, for instance, a cable. The object distance display apparatus 20 in the embodiment of the present invention displays not only the object distance but also other items of lens information, and it will hereinafter be referred to as the lens information display device 20. The lens information display device 20 may be detachably fixed to the lens device 10 with bolts or the like. The lens information display device 20 need not be a device produced specifically for displaying lens information, but may be any appropriate commercially available computer, such as a personal computer (laptop computer or else) or a mobile terminal.

The lens information display device 20 is mounted with, in addition to a CPU 22, a serial communication interface (SCI) 24, which makes possible communication with external devices. The lens device 10 is also mounted with an SCI 18, which makes possible communication with external devices. Therefore, by connecting the communication connector of the lens information display device 20 to that of the lens device 10 through a cable or otherwise, the CPU 22 of the lens information display device 20 can communicate signals with the CPU 14 of the lens device 10 back and forth. The means of communication between the lens information display device 20 and the lens device 10 need not be wired but may be of any appropriate system, which need not necessarily be wired but as well be wireless.

The CPU 22 of the lens information display device 20, using such means of communication, acquires required lens information from the CPU 14 of the lens device 10, and figures out lens information to be displayed on the LCD panel 26 of the lens information display device 20.

The LCD panel 26 is an LCD panel with a touch panel function, and a touch panel 30 is mounted on the surface of the LCD panel 26. The CPU 22 causes a required selector switch to be displayed on the LCD panel 26, and knows via the touch panel 30 and a touch panel control unit 32 which selector switch has been touched on the screen. According to the selection of a selector switch in this manner, the user can change over as appropriate the contents of lens information to be displayed on the LCD panel 26 and the processing mode (to be described afterward).

The lens information acquired from the lens device 10 here is recognizable by the CPU 14 of the lens device 10. The items of lens information include, for instance, specifications data representing the optical specifications of the lens device 10, the type denomination of the lens device 10 and positional data (positional information) indicating the current set positions of the zoom lens assembly ZL, focusing lens assembly FL, extender lens assembly EL and iris I. The current set positions of the zoom lens assembly ZL, focusing lens assembly FL, extender lens assembly EL and iris I are respectively referred as the zoom lens assembly position, focusing lens position, extender lens assembly position (extender magnification) and aperture stop (iris diameter).

The specifications data include data intrinsic to the lens device 10 that are required when lens information to be displayed on the LCD panel 26 and, by using these specifications data and the positional data on the zoom lens assembly position, focusing lens position, extender lens assembly position and aperture stop, desired lens information different from what has been acquired from the lens device 10 can be figured out. A possible alternative arrangement is to register in advance specifications data corresponding to a variety of lens devices in a memory in the lens information display device 20 and, by acquiring the type denomination of a lens device 10, to read specifications data corresponding to that type denomination out of the memory instead of acquiring the specifications data from the lens device 10.

The items of lens information to be displayed on the LCD panel 26 of the lens information display device 20 include, for instance, the object distance, depth of field, focal distance, angle of view, F number and T number in addition to the zoom lens assembly position, focusing lens position, extender lens assembly position and aperture stop acquired from the lens device 10. These items of lens information including the object distance, depth of field, focal distance, angle of view, F number and T number can be computed according to the specifications data and positional data acquired from the lens device 10.

It is also possible for the CPU 22 of the lens information display device 20 to figure out the items of lens information according to a conversion table registered in advance in a memory in the lens information display device 20 instead of computing the items of lens information according to the specifications data and positional data acquired from the lens device 10.

It is also possible to file the items of information acquired from the lens device 10 and the computed items of information, name the files in a manner permitting easy distinction by the user (by the date, scene number, local name, etc.), store them in a prescribed memory in the lens information display device 20 (a built-in rewritable medium, a detachable recording medium or the like), keep them readable, and enable the read information to be displayed on the LCD panel 26 or printed out as necessary. In producing a cinematographic film for instance, the focal distance, aperture stop and so forth of the lens device are varied according to the requirements of each scene. If any scene is to be reshot on a later day, the photographic particulars of the already shot scenes can be readily stored in this way, and displaying these particulars on the LCD panel 26 or using them in any other convenient way would significantly facilitate the reshooting.

Incidentally to describe how to process the computation of the object distance which the invention is intended to address, out of the items of lens information to be displayed on the LCD panel 26, figuring out the object distance requires matching of the focusing lens position with the object distance. In this embodiment of the invention, as a way to match the focusing lens position with the object distance, the values of different object distances actually measured in a number of focusing lens positions are entered in advance, and a distance function representing the relationship between the focusing lens position and the object distance over the whole variable range of the focusing lens position is figured out according to those data (actually measured distance data). The use of this distance function makes it possible to figure out the object distance matching the focusing lens position acquired from the lens device 10 as an item of lens information (the object distance at which the object is focused upon in that focusing lens position). The procedure of entering the actually measured distance datum, for instance, can be to arrange a sample object in a certain position and actually measure the distance from the lens device 10 to the sample object in advance, and the focusing lens assembly FL of the lens device 10 is driven to focus on that sample object. Then, the actually measured distance to the sample object is entered into the object distance display apparatus. This results in matching of the focusing lens position set in the lens device 10 with the object distance. By repeating this procedure at different distances of the sample object, a plurality of focusing lens positions and object distances can be matched with each other. According to this matching, a distance function representing the relationship between the focusing lens position and the object distance is figured out, the distance function is worked out on that basis, and every position in the whole variable range of the focusing lens position is matched with one object distance or another.

In the embodiment of the present invention, the measured distance data are supposed to be stored into a rewritable memory 34 built in the lens information display device 20. Alternatively, the measured distance data may as well be stored into a recording medium (not shown) which is detachably mounted to the lens information display device 20. Where the measured distance data are stored into the memory 34 built in the lens information display device 20, a measured distance datum matching each type of lens device is stored into the memory 34 as it is and, by reading out of the memory 34 the measured distance datum matching the type of that lens device according to the type name of a lens device acquired as lens information from the lens device and thereby working out the distance function, object distance information matching a plurality of types of lens device can be displayed. Where the measured distance data are stored into a recording medium detachable from the lens information display device 20, it is made possible to display object distance information matching a plurality of types of lens device in the same way as described above by allowing measured distance data matching a plurality of types of lens device to be stored into a single recording medium. Alternatively, it is also possible to store measured distance data into a recording medium for each type of lens device and, by replacing the recording medium to be mounted on the lens information display device 20 according to the lens device to be used, to display object distance information matching any desired type of lens device. Further, the measured distance data can be stored in a memory of the lens device 10 and acquired as lens information (specifications data) from the lens device 10 instead of storing the measured distance data into a memory of the lens information display device 20 (either the built-in memory 34 or a detachable recording medium). In this case, if the measured distance data stored in the memory of the lens device 10 (which may be a detachable recording medium) are enabled to be rewritten by an operation on the lens information display device 20, the measured distance data can be modified, as will be described afterwards, by a measured distance data entering (modifying or deleting) operation on the lens information display device 20. Or, even where measured distance data are to be stored into a memory of the lens information display device 20, it is possible to store standard measured distance data in a memory of the lens device 10, keep the standard data usable when no measured distance datum matching the pertinent lens device type is stored in the lens information display device 20, or to use them as initial data when measured distance data are to be entered the lens information display device 20.

Next will be described the particulars of processing by the CPU 22 of the lens information display device 20 in each mode with reference to the screen displayed on the LCD panel 26 in each mode and the operation controlled from that screen.

Figure 2:
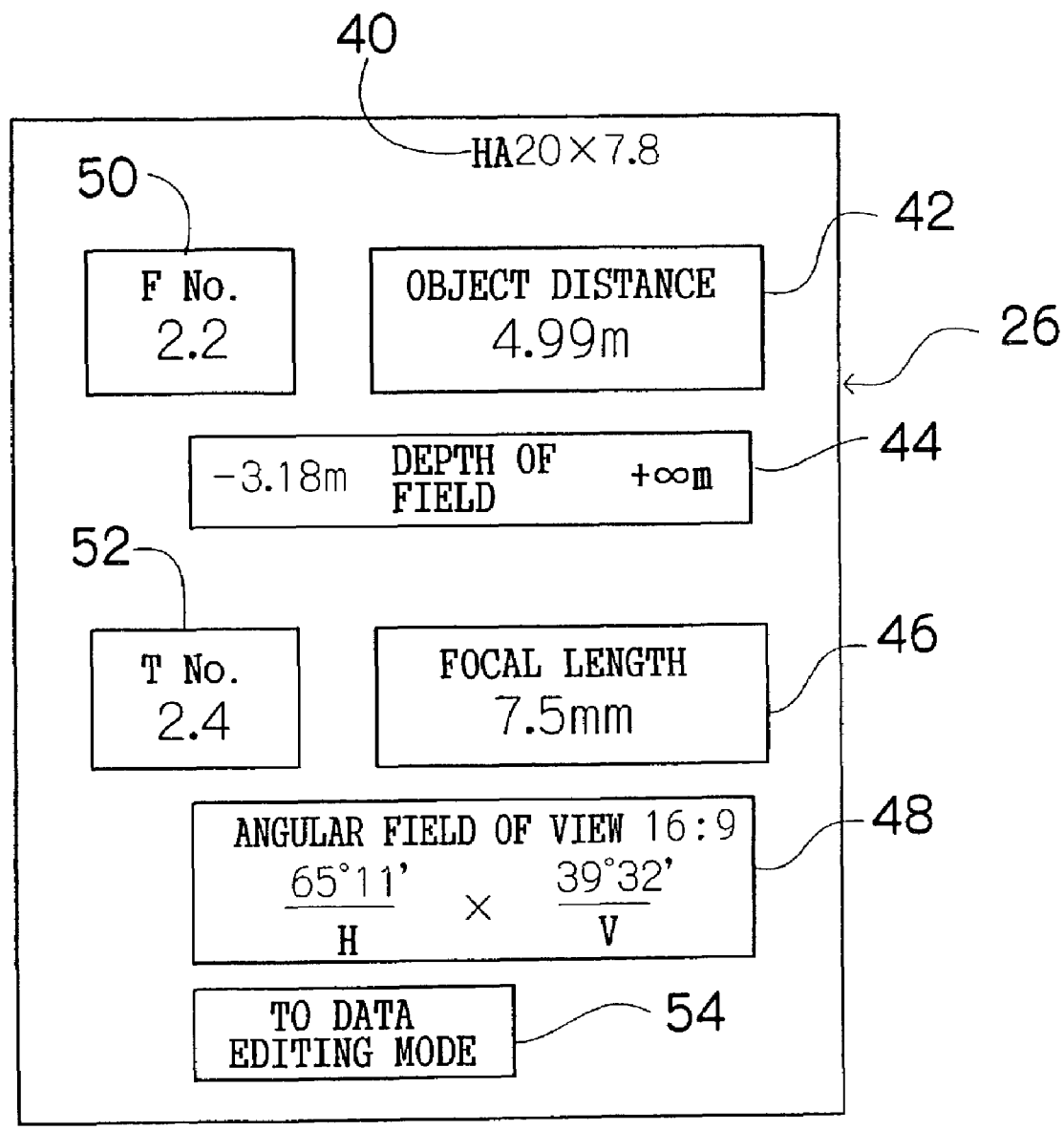
FIG. 2 shows an example of an information display mode screen in an information display mode.

FIG. 2 shows one example of an information display mode screen in an information display mode. The information display mode is a basic information display screen for displaying various items of lens information. As illustrated here, in the top part of the screen, designated by numeral 40, the type name information of the lens device 10 is stated to be, for instance, "HA20×7.8". In the part immediately below, designated by numeral 42, the object distance information is stated to be, for instance, "4.99 m"; in the part next below, designated by numeral 44, the depth of field information is stated to be, for instance, "−3.18 m" for the forward depth of field and "+∞m" for the backward depth of field; in the part immediately below the entries regarding the depth of field, designated by numeral 46, the focal distance information is stated to be, for instance, "7.5 mm", and in the part next below, designated by numeral 48, the angle of view information is stated to be, for instance, "65°11′" for the horizontal direction and "39°32′" for the vertical direction. In the part to the left of the object distance entry, designated by numeral 50, the F number information is stated to be, for instance, "2.2" and in the part to the left of the focal distance entry, designated by numeral 52, the T number information is stated to be, for instance, "2.4".

In the bottom part of the screen is displayed a selector switch 54 for shifting to a data editing mode, and a shift to the data editing mode, to be described afterwards, can be accomplished by touching this selector switch 54. The data editing mode includes an input mode and a deleting mode.

The aforementioned items of lens information are figured out according to positional data representing the zoom lens assembly position, focusing lens position, extender lens assembly position and aperture stop (position signals obtained by the potentiometers ZP, FP, EP and IP) currently set in the lens device 10, and it is also possible to have various control signals representing the target positions (what designate the target positions out of the zoom control signal, focus control signal, extender control signal and iris control signal; hereinafter collectively referred to as control information) provided to the CPU 14 of the lens device 10 acquired by the CPU 22 of the lens information display device 20, figure out lens information in the same way as described above according to that control information, and display it on the LCD panel 26 instead of using these positional data. In this case, the items of lens information displayed on the LCD panel 26 indicate the target values to be achieved in the current state of the control signals.

It is also conceivable to make the type and display form of lens information switchable (between numerical display and graphic display, between metric and yard-pound expressions, between the angle of view display in the screen size of 16:9 and that in the screen size of 4:3 and so forth). In this case, a change-over switch for changing over the type and display form of lens information can be displayed on the screen.

Figure 3:
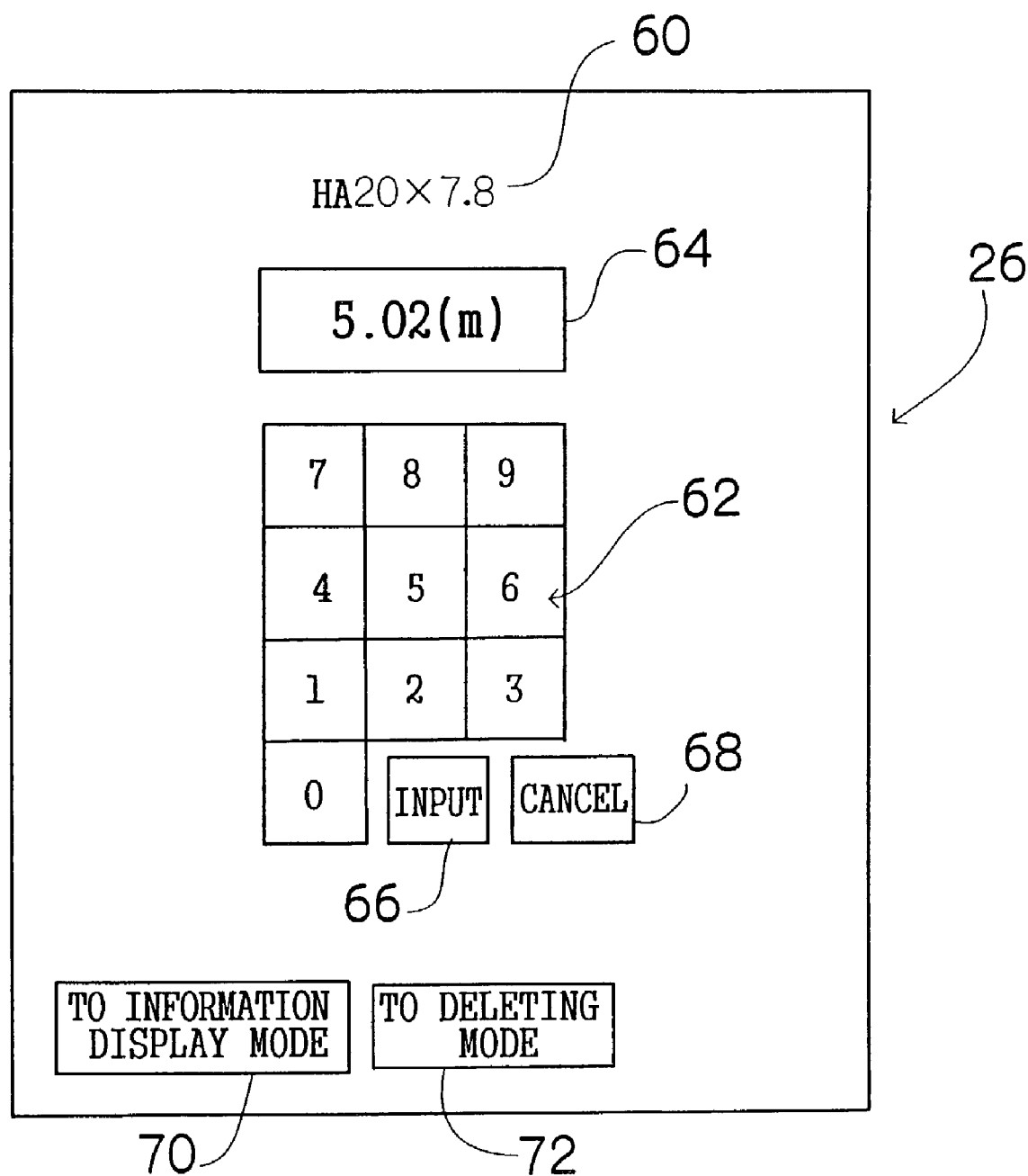
FIG. 3 shows an example of an input mode screen in an input mode when a shift to a data editing mode has taken place.

FIG. 3 shows one example of an input mode screen in the input mode when a shift to the data editing mode has taken place. The input mode is a screen for entering a measured distance datum. When a shift from the information display mode to the data editing mode has taken place, this input mode screen is displayed. As illustrated here, in the top part of the screen, designated by numeral 60, the type name information of the lens device 10 is stated to be, for instance, "HA20×7.8". In the middle of the screen, a ten-key set 62 for entering numerals 0 to 9 is displayed; and in the part immediately above, designated by numeral 64, a numerical value entered by the ten-key set 62 is stated to be, for instance, "5.02 (m)". When a measured distance datum is to be entered, the ten-key set 62 is touched to have the value of the measured distance datum to be entered displayed on a display unit 64. Then as an input switch 66 is touched, the entry of the value of the measured distance datum displayed on the display unit 64 is made definite, while touching a canceling switch 68 would result in cancellation of the entry of the value displayed on the display unit 64. The measured distance datum entering procedure in specific terms, as described above, is as follows: first, the sample object is arranged in a certain position, the distance from the lens device 10 to that sample object is actually measured, and the focusing lens assembly FL of the lens device 10 is driven to focus on that sample object. Then, the ten-key set 62 is used to enter the actual measurement of the distance to the sample object as the measured distance datum and, after confirming the correctness of the entry by the value displayed on the display unit 64, the input switch 66 is touched. The CPU 22 of the lens information display device 20 will have acquired from the lens device 10 as the positional datum the focusing lens position then set, and that focusing lens position and the measured distance datum entered from the input mode screen, matched with each other, are stored into the memory 34. By repeating this procedure at different distances of the sample object, a plurality of focusing lens positions and object distances can be matched with each other, and according to this matching, the distance function is figured out.

It may be so arranged that, when new measured distance data are to be entered by touching the input switch 66, the CPU 22 can check the correctness of the entry (judge whether or not the measured distance data to be entered are normal). For instance, where the object distance should shorten with an increase in the focusing lens position count, if the measured distance datum to be newly entered is found deviating from that normal tendency, that entry can be invalidated, followed by displaying of characters "Error" or the like the display unit 64 or sounding of an alarm tone to alert the user to a likely input error. Judgment of whether or not a measured distance datum to be newly entered deviates from the normal tendency is made by, for instance, comparing it with the measured distance data matching the nearest focusing lens positions in the ascending and descending directions of the focusing lens position (if there is a measured distance datum in only one of those directions, the measured distance datum in that direction) out of the focusing lens positions matched with already entered measured distance data, and checking whether or not the relative length of the measured distance datum to be newly entered is normal.

In the bottom part of the screen is displayed a selector switch 70 for shifting to the information display mode and a selector switch 72 for shifting to the deleting mode in the data editing mode. Touching the selector switch 70 would result in a shift to the information display mode, while touching the selector switch 72 would result in a shift to the deletion mode.

Figure 4:
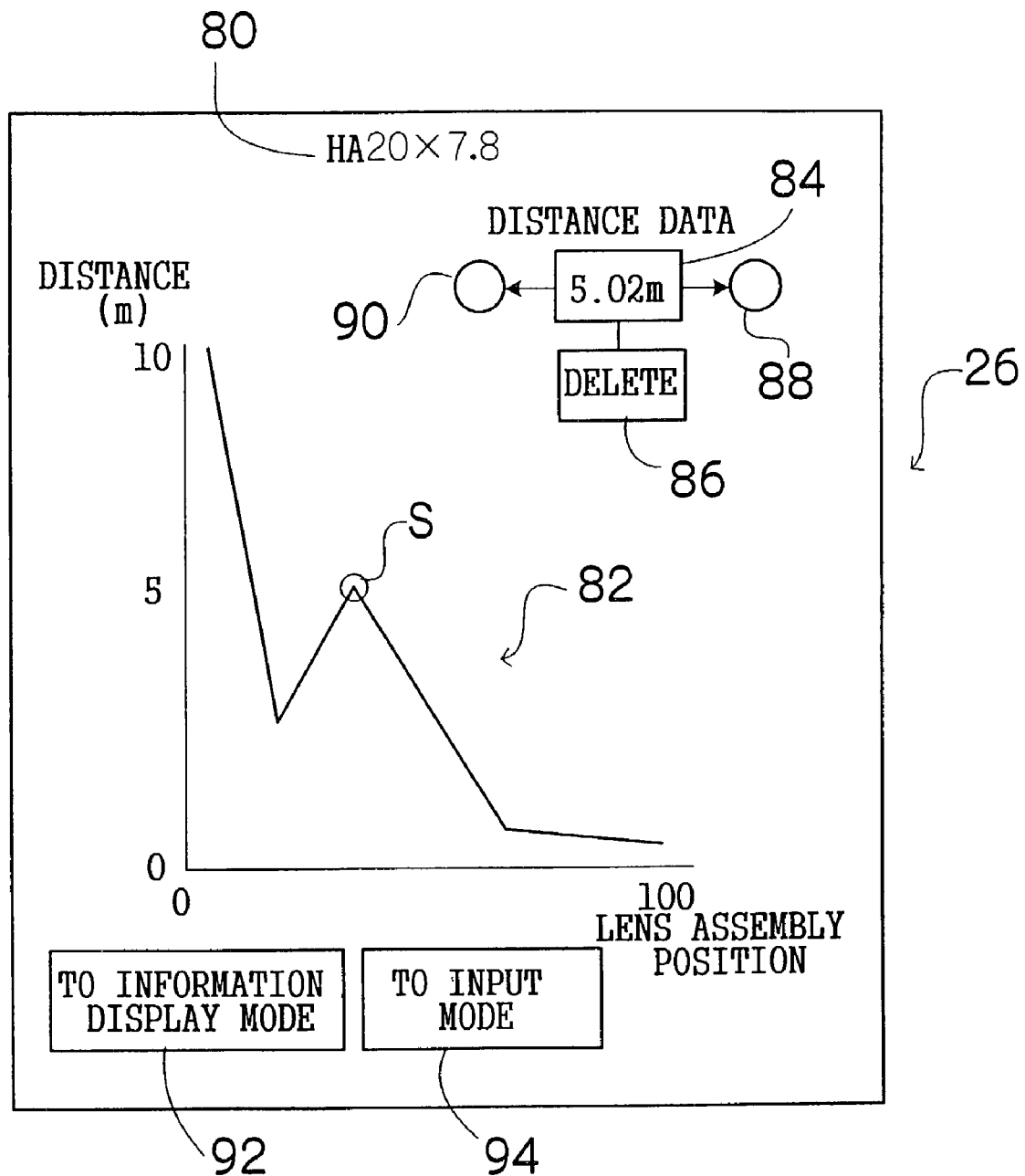
FIG. 4 shows an example of a data editing mode screen in a data editing mode when a shift to a deleting mode has taken place.

FIG. 4 shows one example of a data editing mode screen in the data editing mode when a shift to the deleting mode has taken place. The deleting mode is a mode in which data desired to be deleted among the already entered measured distance data are deleted. As illustrated here, in the top part of the screen, designated by numeral 80, the type name information of the lens device 10 is stated to be, for instance, "HA20×7.8". In the middle of the screen, designated by numeral 82, the already entered measured distance data are graphically displayed. In this graphical representation, the horizontal axis represents focusing lens positions in the range of, for instance, 0 to 100, and the vertical axis, object distances (measured distance data) in the range of, for instance, 0 to 10 (m). A point S marked with "○" (selected point) in the graph represents the point where a measured distance datum is entered and which is currently selected. By graphically displaying measured distance data in this manner, it is made easier to check whether there are no abnormal data among the measured distance data which are already entered (stored in the memory). For instance, the measured distance datum at the selected point S in the graph, when compared with measured distance data around, can be readily judged to be evidently unnatural in relative length and accordingly that it is an abnormal value. The measured distance data may as well be displayed numerically, instead of graphically, in a matter permitting their matching with focusing lens positions can be easily recognized.

In the upper right part of the screen, designated by numeral 84, the measured distance datum at the currently selected point S is stated to be, for instance, "5.02 m", and when a delete switch 86 immediately is touched in this state, the measured distance datum at the selected point S is deleted. Thus, if the measured distance datum at the selected point S is found unnatural and judged to be an entry error, that measured distance datum alone can be deleted from the memory 34 by touching the delete switch 86. In this way, even if one measured distance datum is deleted, other measured distance data are not deleted but remain as they are in the memory 34, and accordingly even if a wrong datum is entered, correction can be easily done. If a correct measured datum is to be entered in place of the deleted measured distance datum, a shift to the input mode is performed, the sample object is arranged again in the position in which the sample object was arranged when that deleted measured distance datum was entered (it need not be the same position), the distance to that sample object is directly measured, and the resultant measurement is entered as described above. Or it may as well be so arranged that, instead of performing such a data entering operation, the correct measured distance datum matching the focusing lens position of the deleted the measured distance datum, irrespective of the focusing lens position of the lens device 10, can be immediately entered after deleting the wrong measured distance datum.

In the part to the right of the display 84 in the deleting mode screen, designated by numeral 88, there is a "○" mark, and touching this "○" mark would result in shifting of the selected point S to a data entering point adjoining that selected point S on the right (the ascending direction of the focusing lens position) on the graph. There is also a "○" mark the part to the left of the display 84, designated by numeral 90, and touching this "○" mark would result in shifting of the selected point S to a data entering point adjoining that selected point S on the left (in the descending direction of the focusing lens position) on the graph.

In the bottom part of the screen are displayed a selector switch 92 for shifting to the information display mode and a selector switch 94 for shifting to the input mode in the data editing mode. Touching the selector switch 92 would result in a shift to the information display mode, while touching the selector switch 94 would result in a shift to the input mode.

Next will be described the processing procedure regarding object distance displaying by the CPU 22 of the lens information display device 20 with reference to the flow chart of FIG. 5. As power supply is turned on, the CPU 22, after performing required initial setting (step S10), carries out connection to the lens device 10 for communication (step S12). Next, it receives from the lens device 10 the position (focusing lens position) of the focusing lens assembly FL (step S14). Then it determines whether or not the mode is for data editing (step S16). If the result here is NO, a shift to the information display mode takes place (the initialization gives the information display mode). The object distance is calculated from the current focusing lens position, using the distance function worked out from the measured distance data as described above (step S18). Then, the information display mode screen shown in FIG. 2 is displayed on the LCD panel 26, and the object distance datum is displayed on that screen (step S20). Upon completion of the processing described so far, the sequence returns to processing at step S14. On the information display mode screen is displayed the selector switch 54 for shifting to the data editing mode as shown in FIG. 2, and touching that selector switch results in a shift to the data editing mode.

If the result at step S16 is YES, i.e. the mode is for data editing, a shift to the input mode in the data editing mode takes place, and the input mode screen shown in FIG. 3 is displayed on the LCD panel 26 (step S22). Then it is determined whether or not the mode is for data deletion (step S24). If the result here is NO, processing in the input mode is continued. To add, until the selector switch 72 is touched on the input mode screen shown in FIG. 3, the input mode will remain, and touching the selector switch 72 would result in a shift to the deleting mode. In the input mode, the CPU 22, following the operational input, matches the focusing lens position acquired from the lens device 10 and the value entered as the measured distance datum with each other, and resisters the match into the memory 34 (step S26). The processing to detect any input error can as well be on this occasion of registering the measured distance datum into the memory 34.

Then, the distance function is computed from the plurality of focusing lens positions stored in the memory 34 and the matching measured distance data (step S28), followed by a return to step S14. To add, touching the selector switch 70 on the input mode screen shown in FIG. 3 would result in completion of the data editing mode and a shift to the information display mode.

If the result at step S24 is YES, i.e. the mode is for data deletion, the CPU 22 displays the deleting mode screen shown in FIG. 4 on the LCD panel 26 (step S30), and deletes designated data (focusing lens position and measured distance data) in accordance with the operational input on the deleting mode screen as described above (step S32). Then a shift to step S28 takes place, and the distance function is computed according to the remaining data having survived the data deletion, followed by a return to step S14. On the deleting mode screen shown in FIG. 4, touching the selector switch 92 would result in a shift to the information display mode, while touching the selector switch 94 would result in a shift to the input mode.

As hitherto described, the object distance display apparatus according to the present invention, as it can display object distance data entered in advance matched with focusing lens positions, can readily notice any abnormal data due to an input error or the like. As it is further enabled to delete or correct any of the already entered object distance data as desired, there is no need to reenter all the data even if some of the data are erroneously entered, but their modification to correct data can be easily accomplished.

Also, when a new object distance datum is to be entered, if it is found abnormal in relative magnitude in comparison with the already entered other data, an alarm on abnormality can be issued, making it possible to exclude what seem to be abnormal data.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An object distance display apparatus which acquires one of a focusing lens position in which a focusing lens of a lens device is currently set and a focusing lens position designated by a focus controlling device to the lens device as a position in which the focusing lens is to be set and displays an object distance matching the acquired focusing lens position, in which by entering in advance object distance data corresponding to a plurality of focusing lens positions through an input device and matching each focusing lens position with an object distance, an object distance matching the acquired focusing lens position is figured out and displayed, the object distance display apparatus comprising:
   a display device which displays the object distance data measured and entered in advance matched with the focusing lens positions in a form of a graph that illustrates a distance function based on the focusing lens positions.

2. The object distance display apparatus according to claim 1, further comprising a correcting device which deletes wrong data as desired out of the object distance data measured and entered in advance.

3. The object distance display apparatus according to claim 2, wherein the correcting device inputs correct data as a substitute for the deleted wrong data.

4. An object distance display apparatus which acquires one of a focusing lens position in which a focusing lens of a lens device is currently set and a focusing lens position designated by a focus controlling device to the lens device as a position in which the focusing lens is to be set and displays an object distance matching the acquired focusing lens position, in which by entering in advance object distance data corresponding to a plurality of focusing lens positions through an input device and matching each focusing lens position with an object distance, an object distance matching the acquired focusing lens position is figured out and displayed, the object distance display apparatus comprising:
   a display device which displays either numerically or graphically the object distance data entered in advance matched with the focusing lens positions;
   an abnormal value determining device which determines, when an object distance datum matching a prescribed focusing lens position is newly entered through the input device, whether or not the newly entered object distance datum is an abnormal value according to a magnitude thereof relative to the already entered object distance data matching other focusing lens positions; and
   an alarming device which gives an alarm when the newly entered object distance datum is determined to be abnormal by the abnormal value determining device.

5. An object distance display apparatus which acquires one of a focusing lens position in which a focusing lens of a lens device is currently set and a focusing lens position designated by a focus controlling device to the lens device as a position in which the focusing lens is to be set and displays an object distance matching the acquired focusing lens position, in which by entering in advance object distance data corresponding to a plurality of focusing lens positions through an input device and matching each focusing lens position with an object distance, an object distance matching the acquired focusing lens position is figured out and displayed, the object distance display apparatus comprising:
   a display device which displays either numerically or graphically the object distance data entered in advance matched with the focusing lens positions;
   a correcting device which deletes or corrects data as desired out of the object distance data entered in advance;
   an abnormal value determining device which determines, when an object distance datum matching a prescribed focusing lens position is newly entered through one of the input device and the correcting device, whether or not the newly entered object distance datum is an abnormal value according to a magnitude thereof relative to the already entered object distance data matching other focusing lens positions; and
   an alarming device which gives an alarm when the newly entered object distance datum is determined to be abnormal by the abnormal value determining device.

* * * * *